2 Sheets--Sheet 1.

C. D. RIGGS.
Bee-Hives.

No. 149,882.  Patented April 21, 1874.

WITNESSES:
Colbourn Brookes
Chas J. Gooch

INVENTOR:
Elisbe D. Riggs
per R. S. & A. Lacey
his attorneys

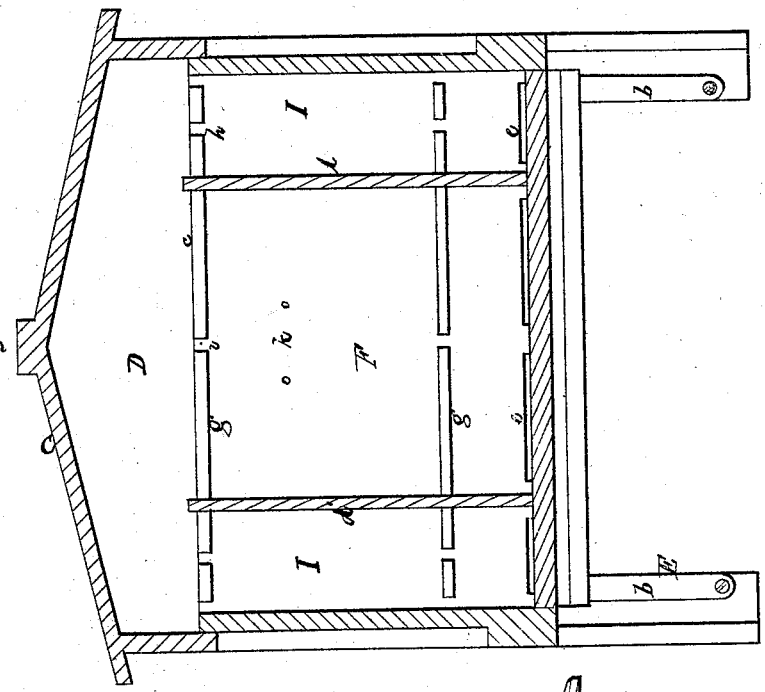
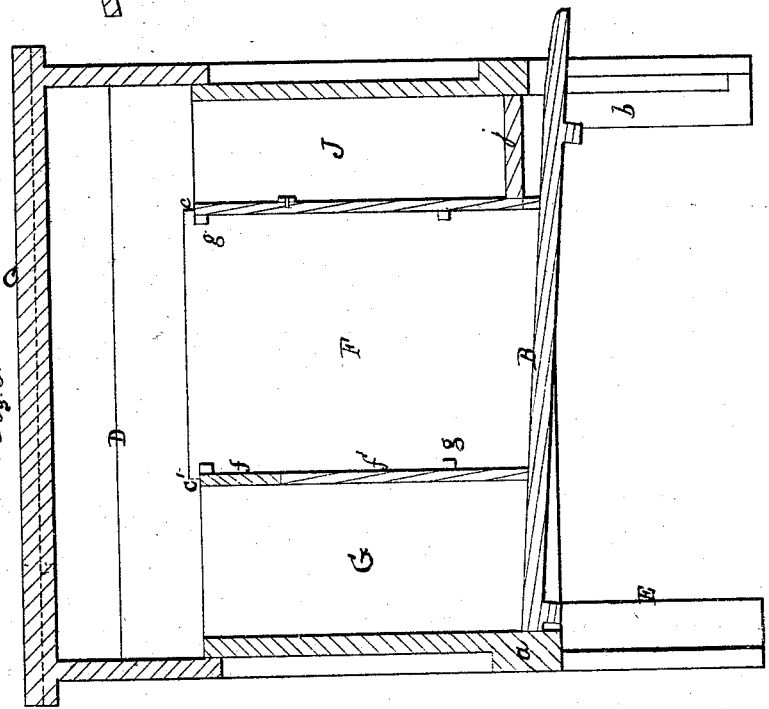

UNITED STATES PATENT OFFICE.

CLISBE D. RIGGS, OF RUSSELLVILLE, TENNESSEE, ASSIGNOR OF ONE-HALF HIS RIGHT TO ROBERT H. ERWIN, OF SAME PLACE.

IMPROVEMENT IN BEE-HIVES.

Specification forming part of Letters Patent No. 149,882, dated April 21, 1874; application filed January 14, 1874.

*To all whom it may concern:*

Be it known that I, CLISBE D. RIGGS, of Russellville, in the county of Hamblen and State of Tennessee, have invented certain new and useful Improvements in Bee-Hives; and I do hereby declare the following to be a full, clear, and exact description of the invention, such as will enable others skilled in the art to which it pertains to make and use it, reference being had to the accompanying drawings, which form part of this specification.

The object of my invention is to provide a cheap, convenient, and substantial bee-hive, which may be enlarged or contracted at pleasure, and which will afford ample room for the storing of surplus honey, facilities for feeding the bees, perfect ventilation, perfect protection for the swarm in winter as well as summer, economy of space and labor in the general care and management of the swarm, and novel devices for handling the honey. It consists in a substantial casing having a central hive or brood-chamber; in constructing around the brood-chamber a series of outer chambers, which may be connected therewith or retained detached, as desired, which outer chambers are for the storing of surplus honey in summer and for room for feeding when such is required, and for the reception of non-conducting packing material in winter for the protection of the swarm from the cold, and for securing equilibrium of temperature, and for ventilation in summer; and in a novel construction of the frames or comb-racks and other mechanism; all of which will be better understood by reference to the accompanying drawings and description.

Figure 1:
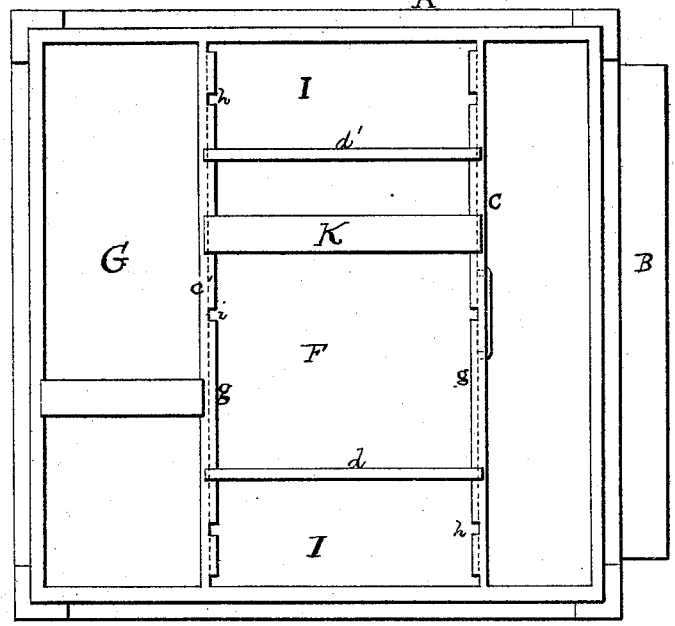
Figure 2:
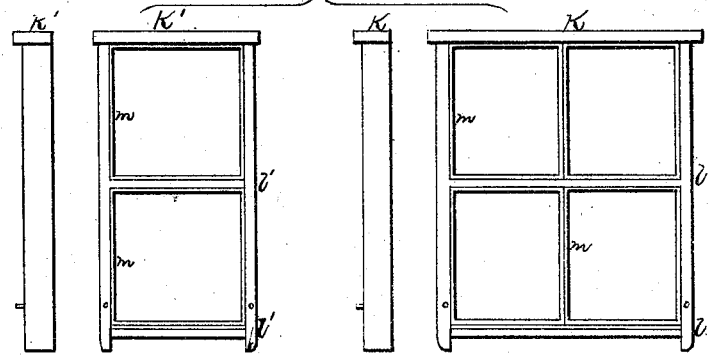

In the drawings, Figure 1 is a plan view, and Figs. 2, 3, and 4 are detail views, of my invention.

A is a casing, which I construct twenty-four inches square. Its end is closed by the door B, which door is hinged at *a*, and held in place by the supports *b*. This door serves as a step on which the bees alight, and by which the bees reach the brood-chamber, and permits of the easy inspection of the hive and the removal of filth or moths without disturbing the operations of the swarm. The upper end of the casing is covered by the neatly-fitting cap C, which is so constructed as to give the air-chamber D above the comb-frames, and so that it can be readily removed, thus giving easy facilities for reaching the chambers, for the purpose of removing the honey or handling the bees. The casing rests on the legs E, which may be made longer or shorter, as desired. I prefer to have my hives on legs, as thereby I am enabled to set the same in any desired place, and I am not required to construct a particular base-board. The hive is clear of the ground, and the air has free circulation around it. F is the main hive or brood-chamber, constructed about thirteen inches square, and placed near the center of the casing A. It is formed by the partitions $c$ $c'$ and the removable sides $d$ $d'$. The partitions $c$ $c'$ have their upper edges, on which rest the comb-frames hereafter described, flush with the top of the casing A. Their under edges rest on the door B. The front partition $c$ is provided with the openings $e$ $e$, through which the bees enter or leave the hive. The rear partition $c'$ is made in two parts, the upper of which $f$ is fixed immovably, and the part $f'$ is removable, being held in place by screws passing through the casing. $g$ are guide-strips secured to partitions $c$ $c'$, provided with grooves $h$ for reception of sides $d$ $d'$, that the size of the brood-chamber may be enlarged to any degree desired, and again contracted as necessity may require. The central groove $i$ is for the insertion of a partition when it is desired to divide the swarm.

The rear chamber G is half the width of the brood-chamber F. In summer, when greater room is needed than is afforded by the other parts of the hive, I remove the partition $f'$, thus throwing this chamber into immediate connection with the main chamber. The end chambers I, are same width of brood-chamber, and I use the same frame in these as in the brood-chamber. The openings $e$ leading to these chambers can be closed by tacking over them a piece of tin or wood when it is desired to exclude the bees. In practice, I use the end chambers for use in gathering the surplus honey, and when full, by means of the removable racks hereafter described, I transfer the comb to the smaller racks in the chamber G.

J is the feeding-chamber. It is closed at the bottom by the board j, and communicates with the main chamber by the openings k. When used for feeding purposes it is closed at the top by a small strip of board laid over it. The entire separation of this chamber from the outside facilitates the security of feeding the bees without attracting the attention of other swarms, a result very much desired, to prevent the robbing so often experienced in feeding weak swarms. K K' are comb-frames, K' being half the size of K, and designed for use in chamber G. They are so constructed that they will entirely close the top of the chambers when sufficient numbers are inserted to fill said chambers. They have a length sufficient to reach near to the door B, and are divided into two equal divisions by the cross-pieces l l', the divisions in frame K' being half the size of divisions in frame K. m are small removable comb-racks, so constructed that one of them will neatly fill a division in frame K', and two fill a division in frame K. They can be slipped in or out at pleasure, and may have a plain face or a raised ridge to give direction to the comb, as may be desired. When the frames are placed within the hive each division is filled with these racks, and when filled with comb and honey I can remove any one without injury to the remainder of the comb in the frame. The upper portions of the comb in the brood-chamber of hives becomes old, thick, and blackened, and must be removed occasionally. By my device this can be done at any time, giving to the bees new comb, while no injury to any remaining comb or loss of honey is met with. I am enabled, further, to remove the surplus honey and pack it securely for market or for winter storing, thus saving the cost usually met with in sending the honey to market in the working-boxes.

In winter I contract the hive to the main chamber F, giving to the bees the best of the honey made during the summer. I then use the chambers G, H, and I for packing some non-conducting material, thereby securing the bees from cold as well as could be done by removing the hive to a close room. The air-chamber D can also be filled with any suitable material, so as to entirely close in the swarm, thereby more effectually protecting the bees. The swarm is not affected by the extreme heat of summer by reason of the great space surrounding it, which is filled with air. Ventilation is secured through the hive by having a small opening covered with wire-gauze in the cap C.

In the construction of my hive I do not confine myself to any particular dimensions of the various parts.

What I claim, and desire to secure by Letters Patent, is—

A bee-hive, consisting of the exterior casing A, fixed partition c, partially-removable partition c', and adjustable partitions d d', arranged substantially as and for the purpose shown.

In testimony that I claim the foregoing I have hereunto set my hand this 10th day of January, 1874.

CLISBE D. RIGGS.

Witnesses:
JAMES PIERCE,
AARON L. WILLIAMS.